United States Patent
Stevens et al.

(10) Patent No.: US 11,606,287 B2
(45) Date of Patent: Mar. 14, 2023

(54) MULTICAST AND BROADCAST STORM PREVENTION

(71) Applicant: Rockwell Collins, Inc., Cedar Rapids, IA (US)

(72) Inventors: James A. Stevens, Lucas, TX (US); Jeffrey D. Bouis, Frisco, TX (US); Naveen Rajanikantha, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/017,535

(22) Filed: Sep. 10, 2020

(65) Prior Publication Data

US 2022/0078108 A1   Mar. 10, 2022

(51) Int. Cl.
| | |
|---|---|
| H04L 29/12 | (2006.01) |
| H04L 12/753 | (2013.01) |
| H04L 12/707 | (2013.01) |
| H04L 12/751 | (2013.01) |
| H04L 45/48 | (2022.01) |
| H04L 45/02 | (2022.01) |
| H04L 45/00 | (2022.01) |
| H04L 61/5007 | (2022.01) |

(52) U.S. Cl.
CPC .............. *H04L 45/48* (2013.01); *H04L 45/02* (2013.01); *H04L 45/22* (2013.01); *H04L 61/5007* (2022.05)

(58) Field of Classification Search
CPC ......... H04L 45/48; H04L 45/02; H04L 45/22; H04L 61/2007
See application file for complete search history.

(56) References Cited

U.S. PATENT DOCUMENTS

| | | | |
|---|---|---|---|
| 7,573,835 B2 | 8/2009 | Sahinoglu et al. | |
| 7,996,558 B2 | 8/2011 | Hsu et al. | |
| 9,258,699 B2 | 2/2016 | Zhao et al. | |
| 10,560,322 B1* | 2/2020 | Kwan | H04W 4/80 |
| 2002/0137459 A1 | 9/2002 | Ebata et al. | |
| 2003/0223402 A1 | 12/2003 | Sanchez et al. | |
| 2008/0240115 A1* | 10/2008 | Briscoe | H04L 45/02 |
| | | | 370/400 |
| 2011/0317696 A1* | 12/2011 | Aldrin | H04L 12/1881 |
| | | | 370/389 |

(Continued)

FOREIGN PATENT DOCUMENTS

| | | |
|---|---|---|
| CN | 1855936 A | 11/2006 |
| CN | 107182103 A | 9/2017 |

(Continued)

OTHER PUBLICATIONS

Extended Search Report in European Application No. 21195841.8 dated Feb. 2, 2022, 13 pages.

*Primary Examiner* — Christopher B Robinson
(74) *Attorney, Agent, or Firm* — Suiter Swantz pc llo

(57) ABSTRACT

A system and method for identifying packets in a that may be stuck in a loop includes logically organizing the network as a tree and modifying packets with an artifice to identify the packets intended directionality within the tree. If the actual directionality conflicts with the intended directionality, a potential loop is indicated. The artifice is a flag in the link header, link address, or IP address associated with the packet.

12 Claims, 3 Drawing Sheets

(56) References Cited

U.S. PATENT DOCUMENTS

| | | | | |
|---|---|---|---|---|
| 2012/0281524 A1* | 11/2012 | Farkas | ................... | H04L 45/24 |
| | | | | 370/242 |
| 2013/0279366 A1 | 10/2013 | Surendran | | |
| 2014/0036913 A1* | 2/2014 | Olofsson | ................ | H04L 45/16 |
| | | | | 370/390 |
| 2016/0277199 A1* | 9/2016 | Nagarajan | ............... | H04L 12/44 |
| 2016/0277209 A1* | 9/2016 | Leiba | ................... | H04W 40/12 |

FOREIGN PATENT DOCUMENTS

| | | | | |
|---|---|---|---|---|
| WO | WO2000076126 A2 * | 7/2000 | ............ | H04L 12/18 |
| WO | 2017034479 A1 | 3/2017 | | |

* cited by examiner

MULTICAST AND BROADCAST STORM PREVENTION

BACKGROUND

Network broadcast and multicast packets are typically transmitted over a lower layer network, such as an Ethernet local area network (LAN), or a point to point link, using a lower layer broadcast address for both broadcast and multicast, or a lower layer multicast address for multicast traffic.

Data networks can experience broadcast and multicast storms where broadcast and multicast packets are routed or switched in a loop between routers or switches so that traffic is sent across a network link multiple times, consuming significant network capacity. This is especially problematic as network topologies change so that routes in different routers and switches are inconsistent.

SUMMARY

In one aspect, embodiments of the inventive concepts disclosed herein are directed to a system and method for identifying packets in a that may be stuck in a loop. The network is logically organized as a tree and packets are modified with an artifice to identify the packets intended directionality within the tree. If the actual directionality conflicts with the intended directionality, a potential loop is indicated.

In a further aspect, the artifice is a flag in the link header, link address, or IP address associated with the packet.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
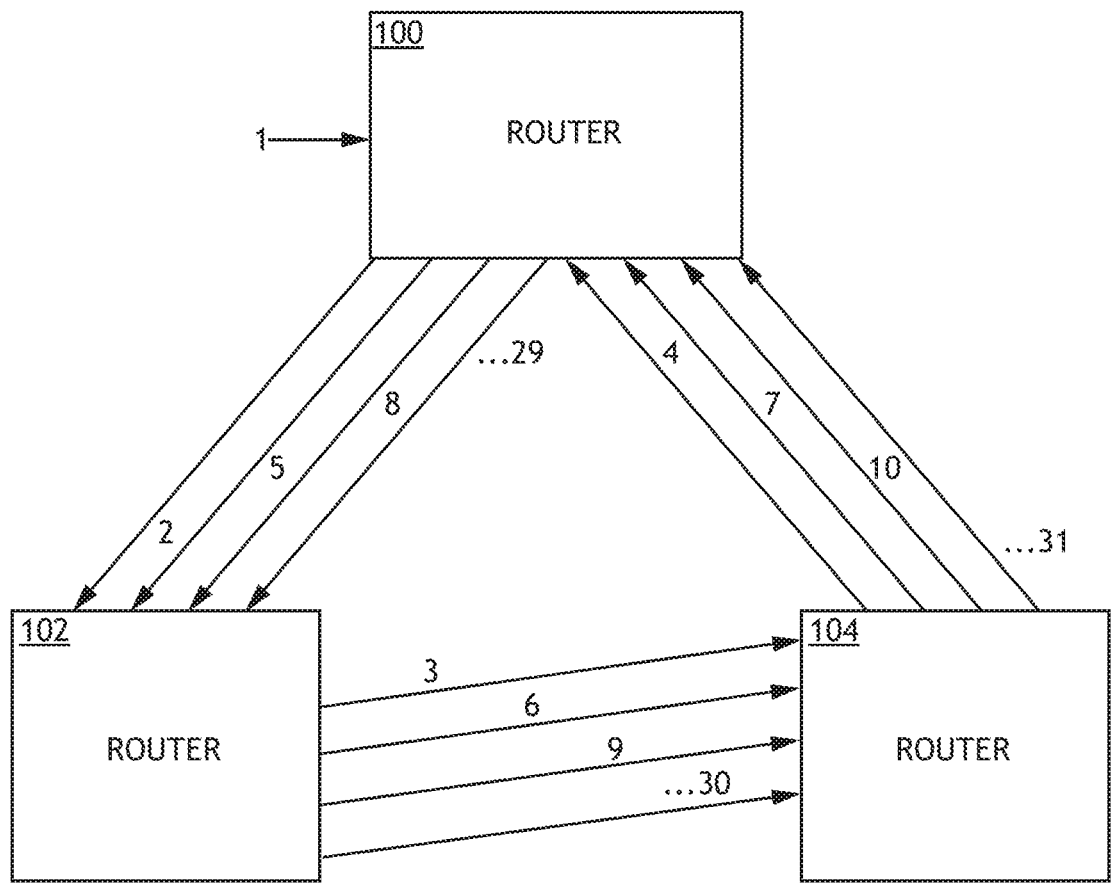
FIG. 1 shows a block diagram of a network according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for identifying packets in a that may be stuck in a loop. The network is logically organized as a tree and packets are modified with an artifice to identify the packets intended directionality within the tree. If the actual directionality conflicts with the intended directionality, a potential loop is indicated.

Referring to FIG. 1, a block diagram of a network according to an exemplary embodiment is shown. In an example of a multicast storm, one or more packets may be received by a first router 100 in the network and then routed to a second router 102 based on a path determined by an internal routing table and the intended destination of the one or more packets. The second router 102 likewise routes the one or more packets to a third router 104 based on a path determined by an internal routing table and the intended destination of the one or more packets. Where the third router 104 determines that the one or more packets should be routed to the first router 100, the one or more packets would be stuck in a loop until a predetermined hop count limit is reached.

Without a mechanism to identify when the one or more packets are stuck in a loop, multiple packets may consume bandwidth while cycling through the network to reach the hop count limit.

Protocols such as Protocol Independent Multicast (PIM) Sparse Mode (SM) or PIM Bidirectional (BIDIR) mode, include routing trees and reverse path forwarding (RPF) checks to prevent multicast traffic from traveling upstream towards the root node of the tree; the root node may be either a multicast source or multicast rendezvous point (RP) depending upon the routing protocol. Multicast storms may occur if routing table are incorrect or unstable, such as during route updates.

Furthermore, some protocols include a maximum hop count, such as time to live (TTL) for Internet Protocol version 4 (IPv4) and hop limit for IPv6. The hop count is tracked each time the packet is forwarded with the packet being discarded whenever the maximum number of relays has occurred.

Alternatively, some systems may discard a packet if it has been routed by a specific router 100, 102, 104 before. Such methodology requires each packet to be unique identifiable by each router 100, 102, 104.

Figure 2:
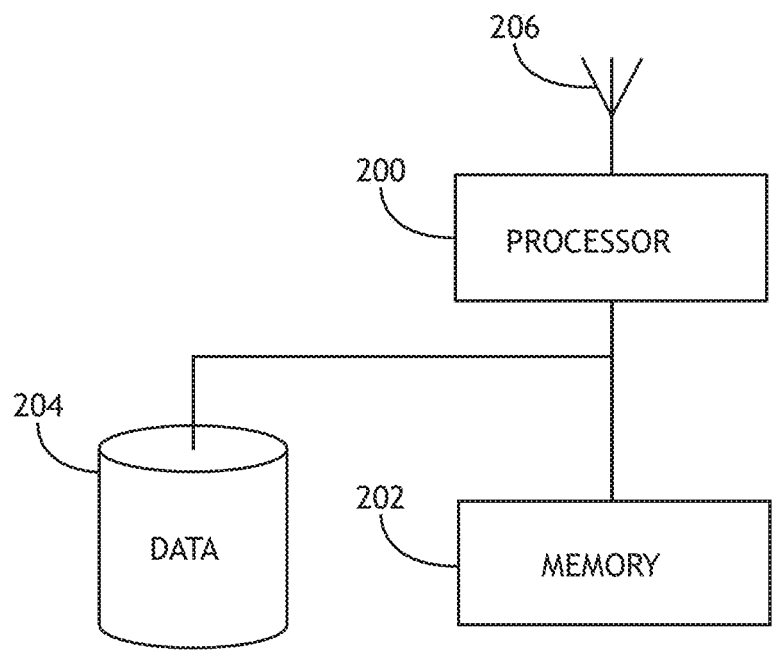
FIG. 2 shows a block diagram of a system suitable for implementing an exemplary embodiment.

Referring to FIG. 2, a block diagram of a system suitable for implementing an exemplary embodiment is shown. The system, embodied in a node or router in a network, comprises a processor 200, memory 202 connected to the processor 200 for embodying processor executable code, and a data storage element 204 for storing data packets. The system also includes a data communication element 206 for sending and receiving data packets to and from other nodes or routers in the network.

In at least one embodiment, the processor 200 builds or receives a unidirectional tree structure corresponding to the structure of the network rooted at a specific point in network or a group portion of the network. In at least one embodiment, each source node within the network may produce a tree to each receiver in the network, potentially including shortest path trees. Protocols useful for implementing the tree-building methodology may include PIM-SM, PIM-DM, PIM-Bidirectional, etc.

When the processor 200 receives a data packet, the processor 200 determines if the data packet includes a flag or other artifice indicating the indented direction of delivery upstream or downstream. If such an artifice exists, the processor 200 checks the destination for consistency with corresponding routing/switching tables before forwarding to determine if the data packet's route within the tree structure is inconsistent with the indicated intended direction. If inconsistent, then the processor 200 discards the data packet to prevent a storm. If the indicated intended direction is consistent, then the data packet is only routed further along the indicated direction.

In at least one embodiment, if the processor 200 determines that the data packet does not include an artifice indicating the intended direction, the processor 200 determines the intended direction and includes such artifice in the data packet before routing. Such artifice may be included as a portion of the link layer packet header. In at least one embodiment, the artifice may comprise a link layer header control field or a portion of a link layer address. In at least one embodiment, two lower layer network/LAN addresses may be defined to correspond to an upstream and downstream broadcast or multicast group instead of a single broadcast/multicast address. For example, an standard Ethernet broadcast address (such as FF.FF.FF.FF.FF.FF) may correspond to broadcast upstream and an alternative address (such as F3.FF.FF.FF.FF.FF) may correspond to a broadcast downstream.

Alternatively, or in addition, a standard IP multicast to Ethernet multicast address mapping from RFC 1112 for IPv4 and RFC 2464 for IPv6 may be used for multicast upstream and an alternative address may be used for multicast downstream.

In at least one embodiment, when a router forwards a broadcast or multicast packet on a link, if it is forwarding it upstream, the forwarding node may set an upstream/downstream field/flag. When a router receives the packet, it may perform standard storm detection methods, such as RPF, max limit, and hop count checks. In addition, it may also check whether the packet is being sent upstream or downstream and if the next hop route matches the expected routing direction. If not, then the packet is discarded.

Figure 3:
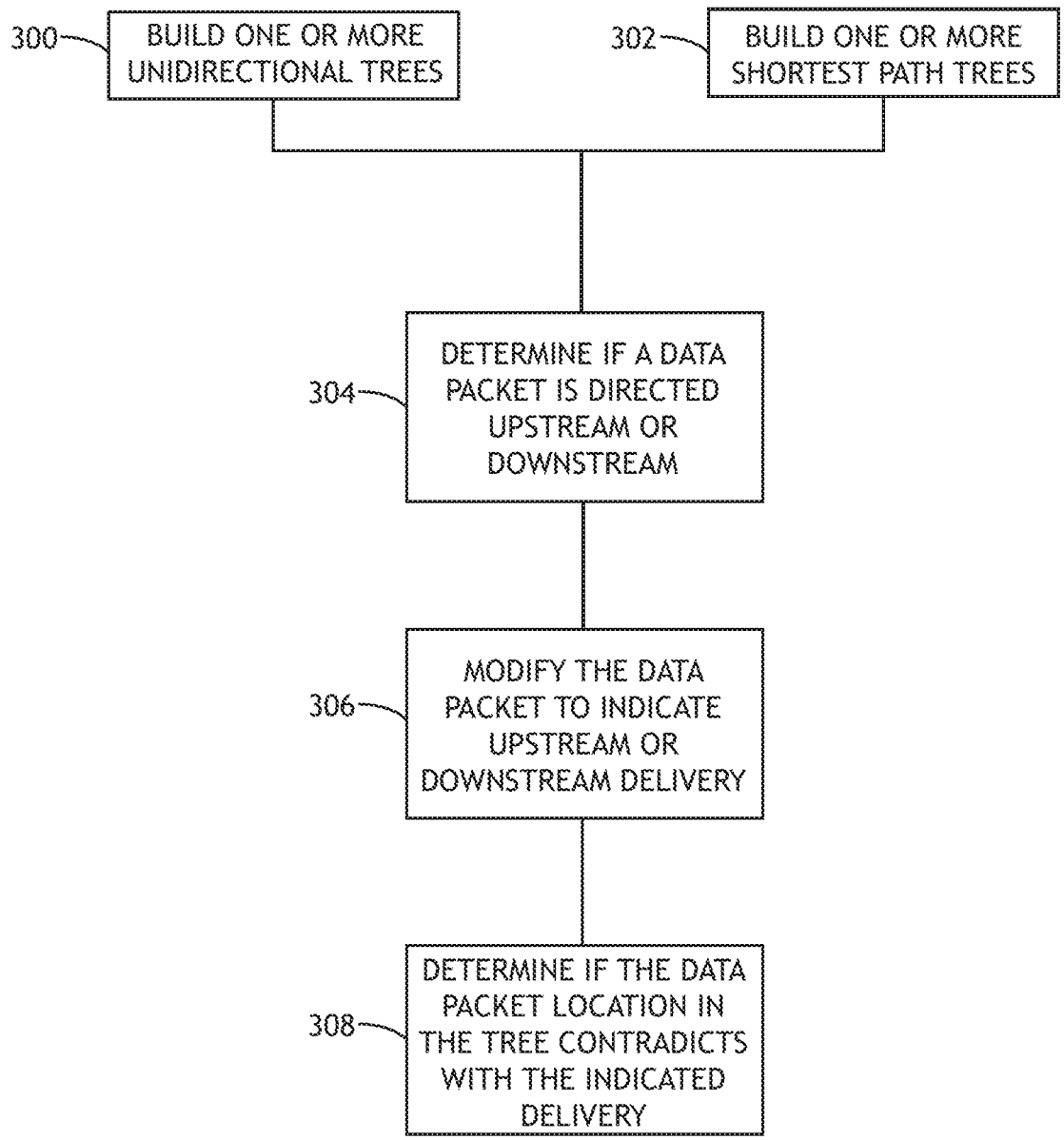
FIG. 3 shows a flowchart of a method according to an exemplary embodiment.

Referring to FIG. 3, a flowchart of a method according to an exemplary embodiment is shown. A processor in a node of a network builds 300 one or more tree structures corresponding to the network structure according to a protocol such as PIM-SM, PIM-DM, PIM-Bidirectional, etc. In at least one embodiment, each processor may also build 302 one or more trees corresponding to one or more shortest paths to other nodes within the network.

After receiving a data packet, a source node in the network determines 304 if the data packet is directed upstream or downstream (toward or away from the root node) within the tree structure. The data packet is modified to indicate the upstream or downstream directionality.

At each routing step, the receiving node determines if an indicator of directionality exists in the data packet; if so, the receiving node determines 308 if the data packet being routed contrary to the indicated directionality. When a data packet is determined to be moving contrary to the indicated directionality, even if the a predetermined hop count has not been reached, further routing of the data packet is discontinued.

Exemplary embodiments enable detecting broadcast and multicast storms when routing protocols are changing or inconsistent between routers. Come embodiments may utilize existing header space so that no overhead is added, instead reusing lower layer network address fields to indicate whether a multicast or broadcast packet is sent upstream or downstream.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A node in a network comprising:
   at least one processor in data communication with a memory storing processor executable code for configuring the at least one processor to:
   querying nodes in the network to identify a tree structure;
   build a unidirectional tree structure rooted at a predefined location in the network based on the tree structure;

build a plurality of shortest path trees to each node in the network;
receive a data packet for routing within the network;
determine if the data packet includes an artifice indicating that the data packet is intended for one of upstream or downstream routing within the network;
if the data packet includes an artifice, determine if the data packet is being routed contrary to the indicated upstream or downstream routing with respect to one of the plurality of shortest path trees;
restrict routing to only nodes that match the indicated upstream or downstream routing;
flag the data packet as stuck in a loop if the data packet is being routed contrary to indicated upstream or downstream routing; and
terminate further routing attempts of the data packet.

2. The node of claim 1, wherein the artifice comprises a flag in a link header.

3. The node of claim 1, wherein the artifice comprises a flag in a link address.

4. The node of claim 1, wherein the artifice comprises a flag in an IP address.

5. The node of claim 1, wherein the tree structure is defined according to one of PIM-SM, PIM-DM, or PIM-Bidirectional.

6. The node of claim 1, wherein the at least one processor is further configured to:
if the data packet does not include an artifice, determine a directionality of the data packet within the tree structure; and
include an artifice in the data packet indicating the directionality.

7. A network system comprising:
a plurality of nodes, each node comprising:
at least one processor in data communication with a memory storing processor executable code for configuring the at least one processor to:
querying nodes in the network system to identify a tree structure;
build a unidirectional tree structure rooted at a predefined location in the network based on the tree structure;
build a plurality of shortest path trees to each node in the network;
receive a data packet for routing within the network system;
determine if the data packet includes an artifice indicating that the data packet is intended for one of upstream or downstream routing within the network;
if the data packet includes an artifice, determine if a next hop of the data packet is contrary to the indicated upstream or downstream routing with respect to one of the plurality of shortest path trees;
restrict routing to only nodes that match the indicated upstream or downstream routing;
flag the data packet as stuck in a loop if the data packet is being routed contrary to indicated upstream or downstream routing; and
terminate further routing attempts of the data packet.

8. The node of claim 7, wherein the artifice comprises a flag in a link header.

9. The node of claim 7, wherein the artifice comprises a flag in a link address.

10. The node of claim 7, wherein the artifice comprises a flag in an IP address.

11. The node of claim 7, wherein the tree structure is defined according to one of PIM-SM, PIM-DM, or PIM-Bidirectional.

12. The node of claim 7, wherein the at least one processor is further configured to:
if the data packet does not include an artifice, determine a directionality of the data packet within the tree structure; and
include an artifice in the data packet indicating the directionality.

* * * * *